Figure 1:
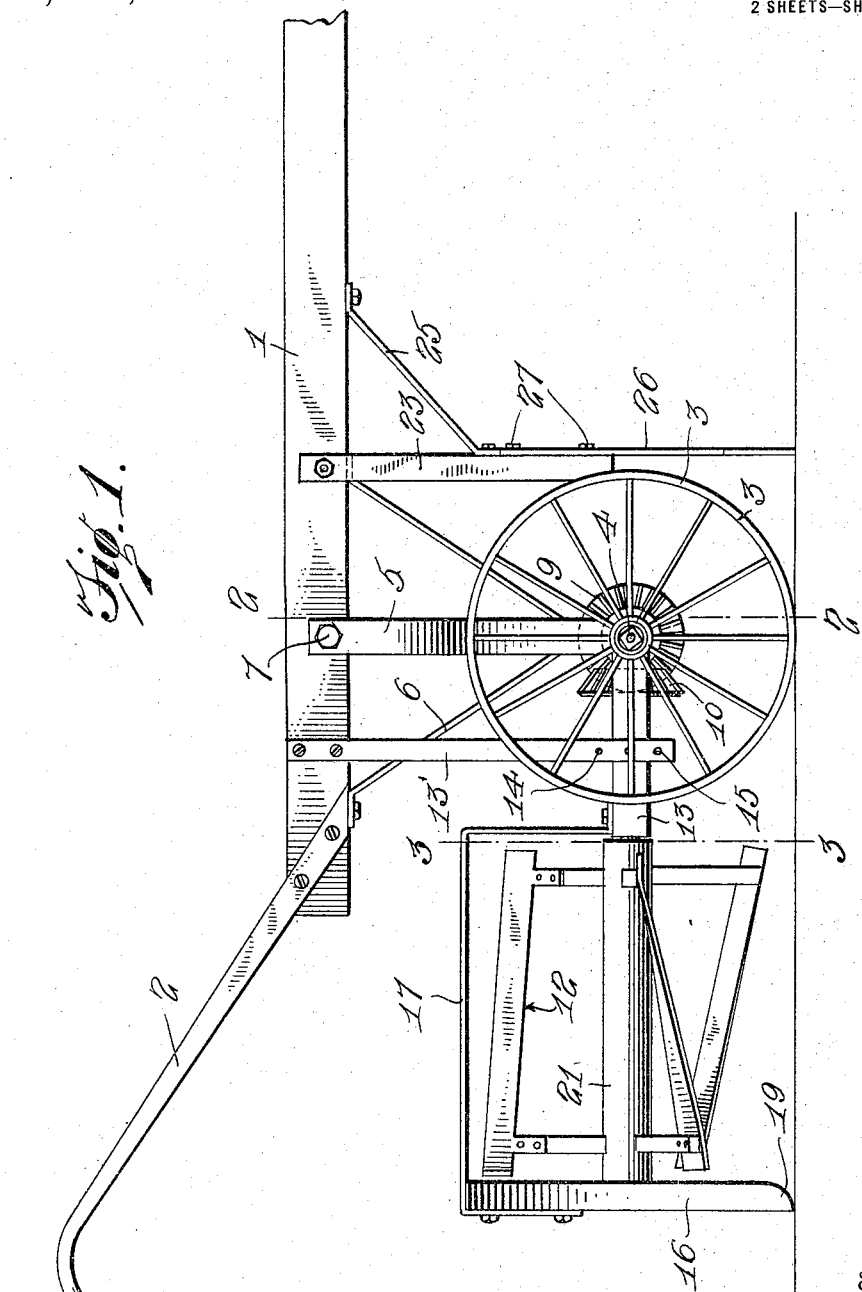

J. DAVIS, Jr.
COMBINED COTTON CHOPPER AND CULTIVATOR.
APPLICATION FILED JULY 19, 1915.

1,200,087.

Patented Oct. 3, 1916.
2 SHEETS—SHEET 1.

Witnesses
C. R. Hardy
W. E. Walker Jr.

Inventor
Joseph Davis Jr
By Richard Owen.
Attorney

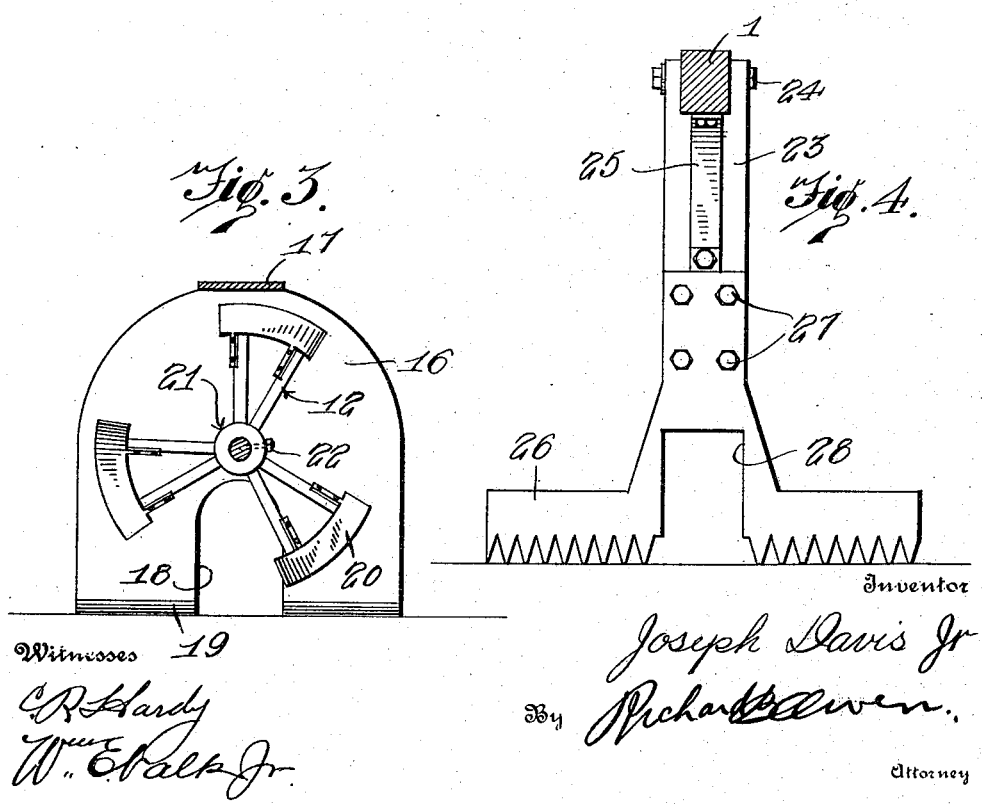

UNITED STATES PATENT OFFICE.

JOSEPH DAVIS, JR., OF WINNSBORO, SOUTH CAROLINA.

COMBINED COTTON CHOPPER AND CULTIVATOR.

1,200,087.   Specification of Letters Patent.   Patented Oct. 3, 1916.

Application filed July 19, 1915. Serial No. 40,685.

*To all whom it may concern:*

Be it known that I, JOSEPH DAVIS, Jr., citizen of the United States, residing at Winnsboro in the county of Fairfield and State of South Carolina, have invented certain new and useful Improvements in Combined Cotton Choppers and Cultivators; of which the following is a specification.

This invention relates to an improved combined cotton chopper and cultivator and as an object contemplates a novel construction, combination and arrangement of parts whereby cotton plants (in rows) may be simultaneously chopped and cultivated to in this manner save both time and labor.

In describing my invention in detail reference will be had to the accompanying drawings wherein like characters denote like or corresponding parts throughout the several views, and in which:—

Figure 1 is a side elevation of my improved combined cultivator and cotton chopping machine; Fig. 2 is a section on the line 2—2 of Fig. 1; Fig. 3 is a section on the line 3—3 of Fig. 1; and Fig. 4 is an elevation of the cultivator.

Referring now to the drawings by numerals, 1 designates the cultivator beam of my improved machine, 2 the handles, 3 the supporting wheels, 4 the wheel axle, 5 the standard and 6 suitable braces therefor. The standard 5 is secured as at 7 to the beam 1 to act with the wheels 3 as the beam support. The wheel axle 4 is journaled in bearings therefor formed by the standard 5, which standard, as shown to advantage in Fig. 2 of the drawings, is enlarged at its base and cut away as indicated at 8 to provide an operating space for a gear 9 keyed or otherwise secured to the said wheel axle. Gear 9 is of the bevel type and, during forward movement of the machine, drives a like gear 10 mounted on a shaft 11 upon which the rotary cotton chopper, designated as an entirety by the numeral 12 is mounted.

A bracket 13 is secured to the axle 4, which bracket, as will hereinafter appear, is adjustable vertically to provide for a like adjustment of the cotton chopper 12. Said bracket acts as a support or bearing for the shaft 11 and, like the standard 5, is cut away to provide an operating space for the gear 10.

A substantially U-shape support 13′ is hung to depend from the beam 1 to act as a means whereby the bracket 13 is supported in a substantially horizontal plane. Apertures 14 are formed in the extensions of the U-shape support, and in alined relation, that a removable pin 15 may be arranged beneath the bracket 13 to support said bracket in its adjusted position.

The opposite end of the shaft 11 from that journaled in the bracket 13 is journaled in a drag 16 movable with said bracket. A protecting strap or band 17 is secured at one end to said bracket 13 and at its opposite end to the drag that the latter may be at all times maintained rigid with the bracket. The mentioned drag, as shown in Fig. 3 is cut away as indicated at 18 to afford a space for the cotton plants over which it is moved. The contacting or ground engaging terminal of the mentioned drag is rounded as indicated at 19 to compress and smooth the harrowed soil at each side of the row of plants under cultivation.

The cotton chopper 12 is of the rotary type in that it is made up of a plurality of angularly disposed blades 20, each of which is fastened to a hub structure 21 keyed or otherwise secured as indicated at 22 to the shaft 11. By setting the blades 20 at an inclination a shearing cut may be obtained.

A depending support 23 is secured as at 24 to the beam 1 forwardly of the standard 5, said support being braced as indicated at 25 against movement. A centrally divided harrow structure 26 is detachably secured as at 27 to the support 23 to engage with the ground or soil during a cotton chopping operation to pulverize and cultivate the ground or soil at each of the row of cotton plants to be thinned. The space 28 between the sections of the harrow structure 26 will allow the said harrow to operate without in any way contacting or in any way injuring the cotton plants.

In operation, the machine is arranged to straddle the plant row that the rotary cutter 12 may engage with and cut the cotton plants. During forward movement of the machine, the harrow structure 26 will engage with the soil at each side of the mentioned row as will the drag 16. By raising or lowering the handle 2 of the machine either the harrow structure or the drag may be forced into firm contact with the ground or soil or entirely out of engagement therewith as desired.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a cotton chopper, a wheel supported axle, a shaft, a driving connection between said axle and said shaft, a bracket oscillatable about said axle to provide for vertical adjustment of said shaft, said shaft being journaled at one end in said bracket, a chopper mounted on said shaft, a hanger support having a plurality of apertures formed therein, means engaging in one of said apertures and with said bracket to maintain said shaft in its vertically adjusted position, a substantially U-shaped runner mounted to engage with said shaft at the opposite end thereof from that engaging with said bracket to provide a bearing therefor, and a protector strip mounted to span said cutter for the purpose specified, said strip being connected at one end to said bracket and at its opposite end to said runner that the latter may be maintained in rigid relation with said bracket and for the purpose set forth.

In testimony whereof I affix my signature in presence of two witnesses.

JOSEPH DAVIS, Jr.

Witnesses:
S. E. LYLES,
E. W. CAMERON.

Copies of this patent may be obtained for five cents each, by addressing the "Commissioner of Patents, Washington, D. C."